(12) United States Patent
Ito

(10) Patent No.: US 6,237,892 B1
(45) Date of Patent: May 29, 2001

(54) GATE VALVE

(75) Inventor: Ichio Ito, Tokyo (JP)

(73) Assignee: V Tex Corporation, Tokyo (JP)

( * ) Notice: Subject to any disclaimer, the term of this patent is extended or adjusted under 35 U.S.C. 154(b) by 0 days.

(21) Appl. No.: 09/507,550

(22) Filed: Feb. 18, 2000

(51) Int. Cl.$^7$ .................................................. F16L 53/00
(52) U.S. Cl. ............................................ 251/203; 251/193
(58) Field of Search ................................... 251/203, 193, 251/326

(56) References Cited

U.S. PATENT DOCUMENTS

| | | |
|---|---|---|
| 3,120,944 | 2/1964 | Cogez et al. . |
| 4,560,141 | 12/1985 | Bösch . |
| 4,721,282 | 1/1988 | Shawver et al. . |
| 5,002,255 | 3/1991 | Sawa et al. . |
| 5,120,019 | 6/1992 | Davis, Jr. . |
| 5,415,376 | 5/1995 | Ito . |
| 5,641,149 | 6/1997 | Ito . |
| 5,755,255 | * 5/1998 | Iwabuchi .............................. 251/158 |
| 6,095,780 | * 8/2000 | Ishigaki et al. ....................... 251/167 |

* cited by examiner

*Primary Examiner*—Joseph A. Kaufman
*Assistant Examiner*—D. Austin Bonderer
(74) *Attorney, Agent, or Firm*—Nilles & Nilles SC

(57) ABSTRACT

A gate valve wherein a valve disc is moved to a position where the valve disc is brought into contact with a valve seat and a position where the valve disc is separated from the valve seat by a driving device provided outside of a valve housing through a valve rod projected from the inside to the outside of the valve housing. The valve disc is brought into contact under pressure with the valve seat in the valve housing when the valve rod is inclined at the end of the movement of the valve rod. A cylindrical bellows is provided at the outside of the valve housing, one end of the cylindrical bellows being sealingly secured to the valve housing and the other end of the cylindrical bellows being sealingly secured to the valve rod. The valve rod is inclined centering arround a center of the axial direction of said cylindrical bellows in the compressed state thereof.

4 Claims, 9 Drawing Sheets

F I G. 5
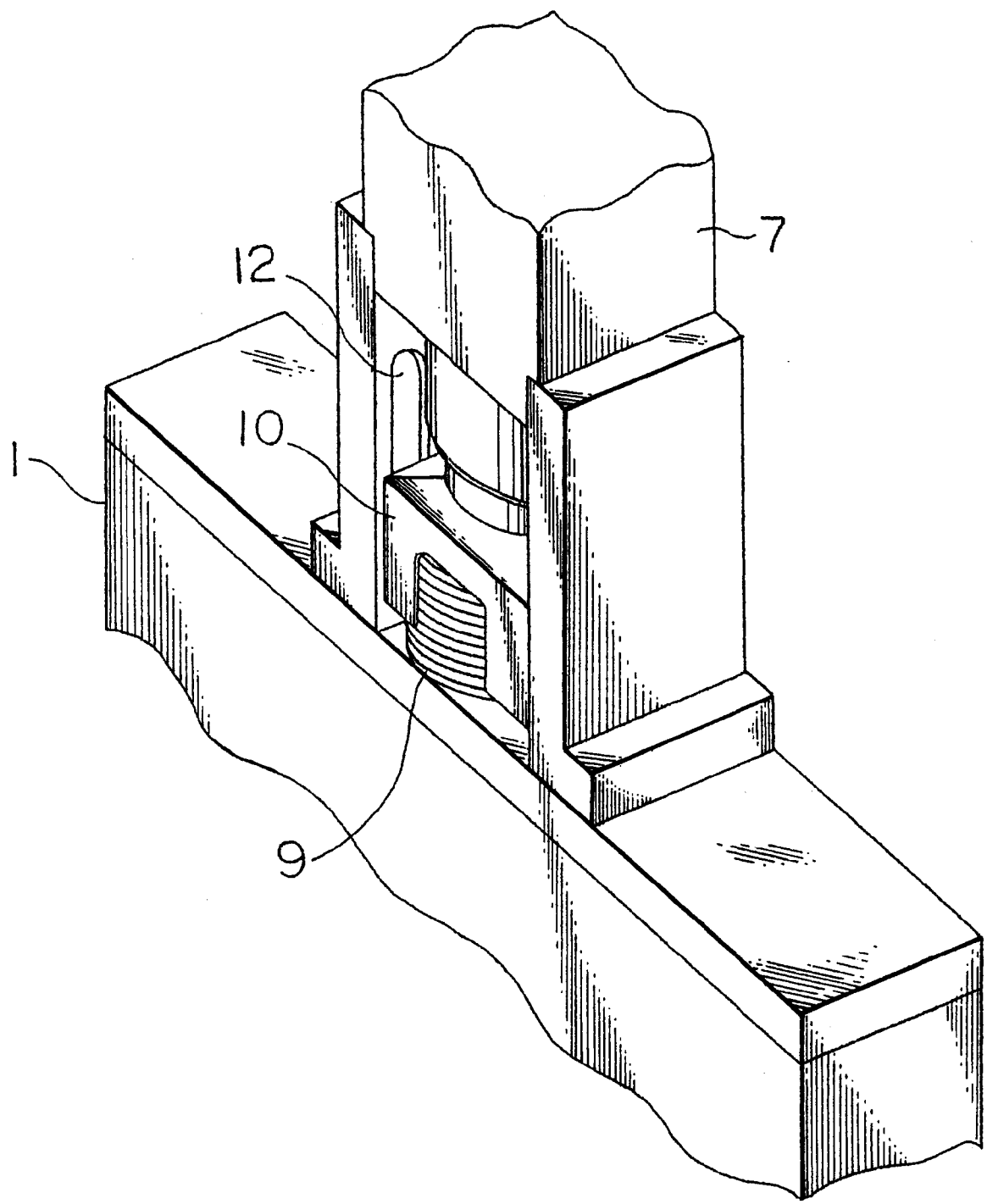

GATE VALVE

BACKGROUND OF THE INVENTION

1. Field of the Invention

The present invention relates to a gate valve and more particularly to a gate valve for use in a processing device for processing a semiconductor wafer or the like.

2. Description of the Prior Art

In a processing device for processing a semiconductor wafer, a liquid crystal substrate or the like, the wafer or the substrate is inserted into or taken out from one of many kinds of processing rooms through passages each having a gate valve. It is necessary to prevent as much as possible foreign matters from entering into the processing room.

Such gate valve is described in the Japanese Patent Laid-Open No. 156781/83. In such gate valve, a valve disc is moved up and down while separating from a valve seat, and the valve disc is brought into contact with the valve seat by urging the side surface of the valve disc toward the valve seat when the valve disc is positioned to face to the valve seat.

In said gate valve heretofore in use, a valve rod for supporting the valve disc and a valve housing are connected by a cylindrical bellows which is extensible, contractible and inclinable in order to cut off the vacuum space in the valve housing from the atmosphere outside of the housing.

However, a large pressure difference is generated between the outside and inside of the cylindrical bellows in the conventional gate valve, and accordingly, when the cylindrical bellows are curved according to the inclination of the valve rod for driving the valve disc an abnormal stress is applied on each portion of the cylindrical bellows, so that the service life of the cylindrical bellows becomes short.

The inventor found out by experiments that the above defect could be obviated by arranging the cylindrical bellows so as to project from the valve housing outwardly so that the outer surface of the cylindrical bellows is subjected to the atmosphere and arranging a pivotal point of the valve rod at a center of the axial length of the cylindrical bellows in the compressed state.

The present invention can be obtained by the above results of the experiments.

SUMMARY OF THE INVENTION

The invention can be summarized as follows.

A gate valve of the present invention comprises a valve housing, a valve disc disposed in said valve housing so that it is selectively brought into contact with a valve seat provided inside of said valve housing, a valve rod sealingly projected from the inside of said valve housing to the outside of said valve housing, said valve rod being capable of moving up and down and inclining, a cylindrical bellows provided at the outside of said valve housing, one end of said cylindrical bellows being sealingly secured to said valve housing and the other end of said cylindrical bellows being sealingly secured to said valve rod, and a driving means provided at the outside of said valve housing for (1) driving said valve rod to move said valve disc between a position where said valve disc is faced with a gap to said valve seat and a position where said valve disc is not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, a roller formed on one of said piston rod and said valve rod, an elongated obligue hole formed on the other of said piston rod and said valve rod, said roller being passed through said hole to connect said piston rod with said valve rod, a spring for separating axially said piston rod and said valve rod from each other, a guide formed on a side surface of said piston cylinder for guiding said valve rod so as to move up and down, and means for inclining said valve rod at a center of the axial direction of said cylindrical bellows in the compressed state thereof, and wherein when said piston rod is urged toward said valve rod, said valve rod is inclined centering around said center and said disc is brought into contact under pressure with said valve seat.

A gate valve of the present invention comprises a valve housing, a valve disc disposed in said valve housing so that it is selectively brought into contact with a valve seat provided inside of said valve housing, a valve rod sealingly projected from the inside of said valve housing to the outside of said valve housing, said valve rod being capable of moving up and down and inclining, a cylindrical bellows provided at the outside of said valve housing, one end of said cylindrical bellows being sealingly secured to said valve housing and the other end of said cylindrical bellows being sealingly secured to said valve rod, and a driving means provided at the outside of said valve housing for (1) driving said valve rod to move said valve disc between a position where said valve disc is faced with a gap to said valve seat and a position where said valve disc in not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, an inclined link with both ends pivotally connected to said piston rod and said valve rod, respectively, so as to connect said piston rod with said valve rod, a spring for separating axially said piston rod and said valve rod from each other, a guide formed on a side surface of said piston cylinder for guiding said valve rod so as to move up and down, and means for inclining said valve rod at a center of the axial direction of said cylindrical bellows in the compressed state thereof, and wherein when said piston rod is urged toward said valve rod, said valve rod is inclined centering around said center and said disc is brought into contact under pressure with said valve seat.

Said valve rod has a pivotal shaft which is guided by said guide, and wherein said pivotal shaft and said guide are located on or near a line passing through the surface of the valve seat facing the valve disc.

Other objects and advantages will become apparent from the following description of the preferred embodiments taken in conjunction with the accompanying drawings.

BRIEF DESCRIPTION OF THE DRAWINGS

FIG. 5 is a perspective view of the gate valve in a state just before the gate valve is closed;

DESCRIPTION OF THE PREFERRED EMBODIMENTS

Figure 1:
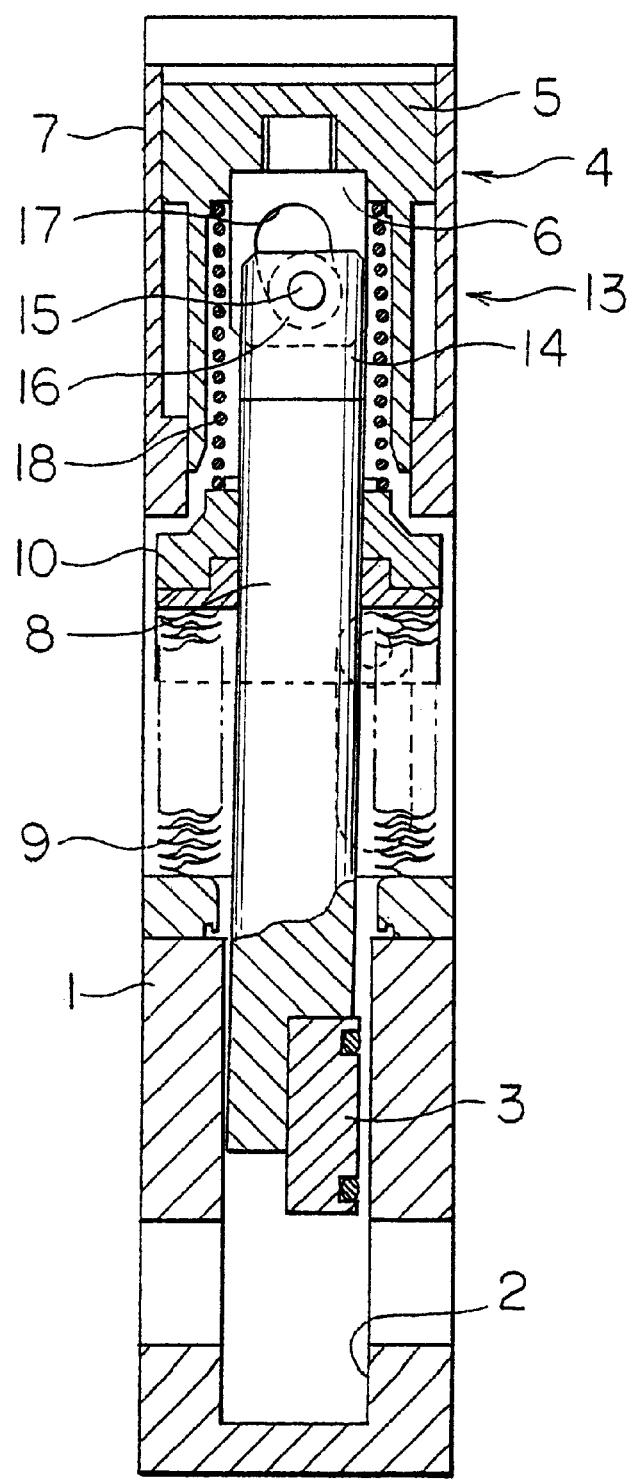
FIG. 1 is a vertically sectioned side view of a gate valve in accordance with the present invention in a state before the gate valve is closed.

In FIGS. 1 to 5, a gate valve is illustrated. Reference numeral 1 denotes a hollow box-like valve housing, 2 denotes a valve seat formed around a rectangular opening of said valve housing 1, 3 denotes a rectangular plate-like valve disc arranged in said valve housing 1 so as to face to said valve seat 2, 4 denotes a piston cylinder means provided on said valve housing 1, 5 denotes a piston of said piston cylinder means 4, 6 denotes a piston rod projected from a center of the lower face of said piston 5, 7 denotes a cylinder of said piston cylinder means 4, and 8 denotes a valve rod connected to said valve disc 3 and projected from the inside of said valve housing 1 to the outside of said valve housing 1.

In the present invention, an upper end of a cylindrical extension bellows 9 is sealingly secured to a portion of said valve rod 8 projected to the outside of said valve housing 1, and a lower end of said bellows 9 is sealingly secured to an outer surface of said valve housing 1.

Further, a cylindrical block 10 is connected to an upper portion of said valve rod 8 so as to cover said cylindrical bellows 9. Pivotal shafts 11 are provided at both sides of said block 10 so as to project in a direction normal to a moving direction of said valve disc 3 in the horizontal plane. Vertical guide grooves 12 of a predetermined length are formed at inner side surface of cylinder 7 of said piston cylinder means 4 for guiding said pivotal shafts 11, so that by the energization of the piston cylinder means 4 the piston rod 6 and the pivotal shafts 11 are lowered along the guid grooves 12 through a connection means 13. Said valve rod 8 can be inclined centering around said pivotal shafts 11 when said pivotal shafts 11 are supported by the lower ends of said grooves 12 and the upper portion of said valve rod 8 is pushed in a direction of an arrow A in FIG. 6. According to the inclination of said valve rod 8, said valve disc 3 connected to the lower end of said valve rod 8 moves in a direction of an arrow B and is brought into contact under pressure with said valve seat 2.

Figure 8:
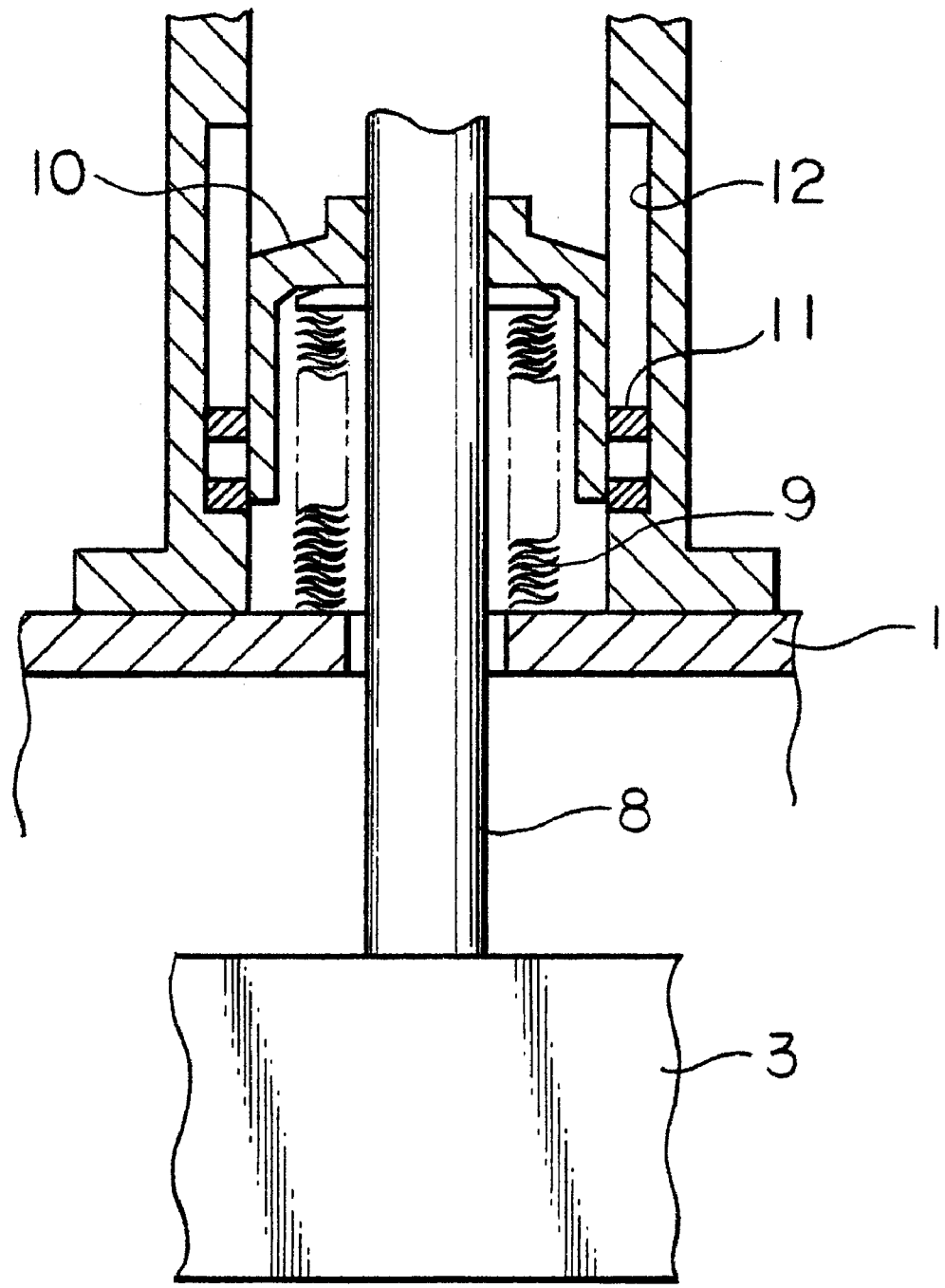
FIG. 8 is a vertical sectional side view of a portion of the gate valve in a state just before the gate valve is closed.
Figure 9:
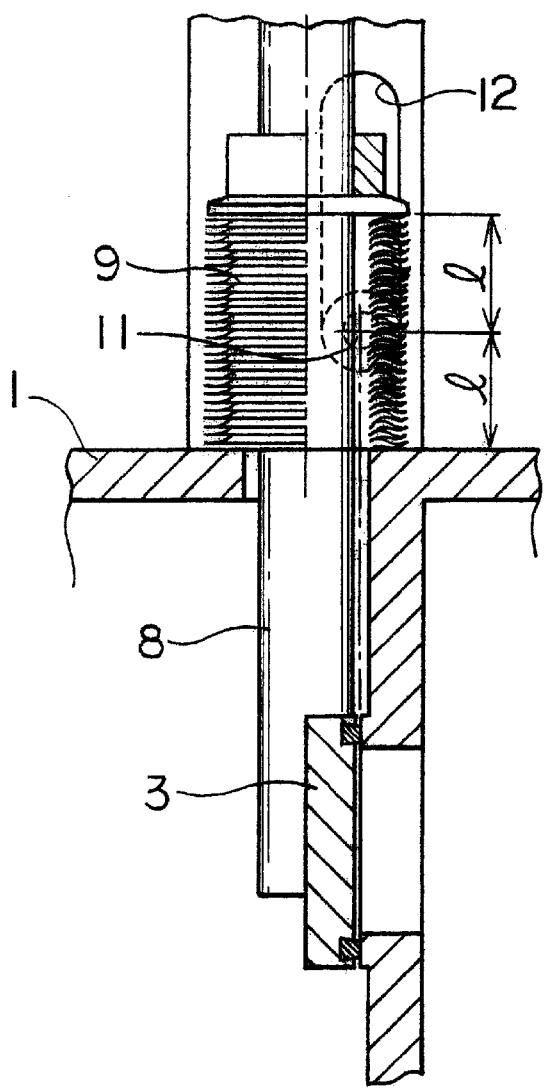
FIG. 9 is a vertical sectional front view of the gate valve of FIG. 6.

Further, in the present invention, as shown in FIG. 8 and FIG. 9, the lower most position of said pivotal shaft 11 to be guided by said guide groove 12 is positioned at the center of the axial length of 2 1 of the cylindrical bellows 9 in the compressed state thereof.

Said connection means 13 comprises a bifurcated portion 14 formed at an upper portion of said valve rod 8, into said bifurcated portion 14 said piston rod 6 extending downwards from the central lower surface of said piston 5 being inserted, a pin 15 mounted on said bifurcated portion 14, a roller 16 supported rotatablly freely by said pin 15, an oblique elongated hole 17 formed in said piston rod 6, into which the roller 16 is inserted, and a tension spring 18 inserted between said piston rod 6 and said valve rod 8 so as to separate from each other.

Figure 2:
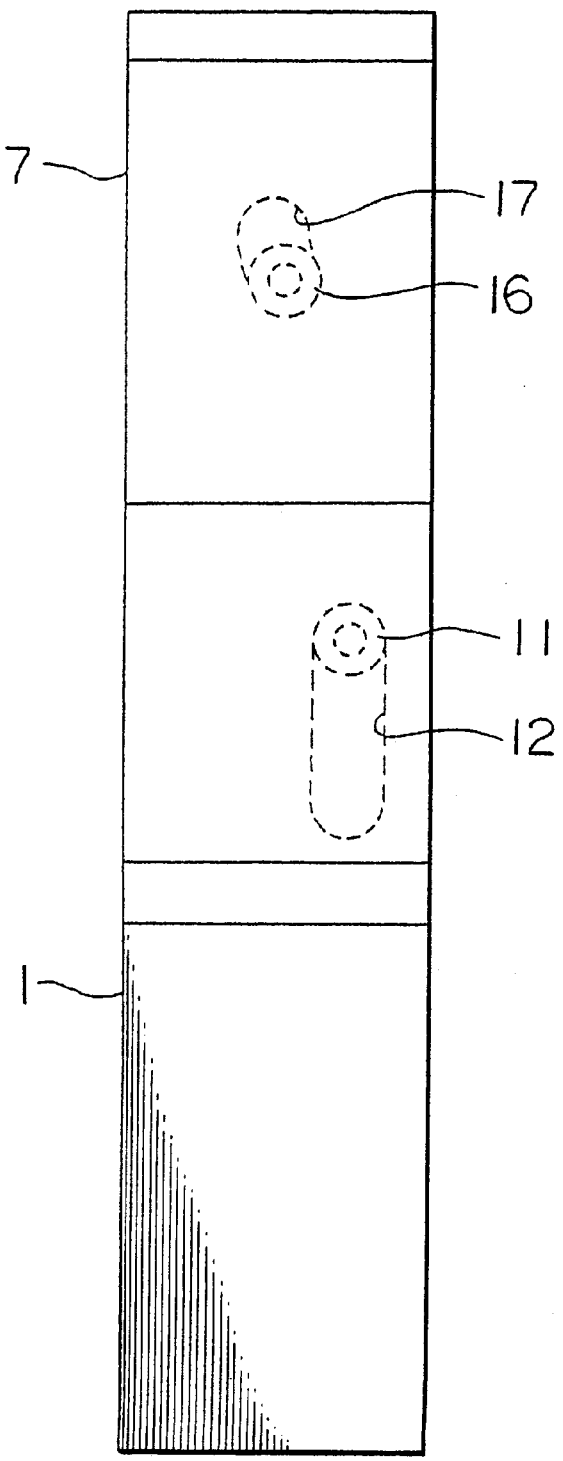
FIG. 2 is a side view of a gate valve in accordance with the present invention in a state before the gate valve is closed.
Figure 3:
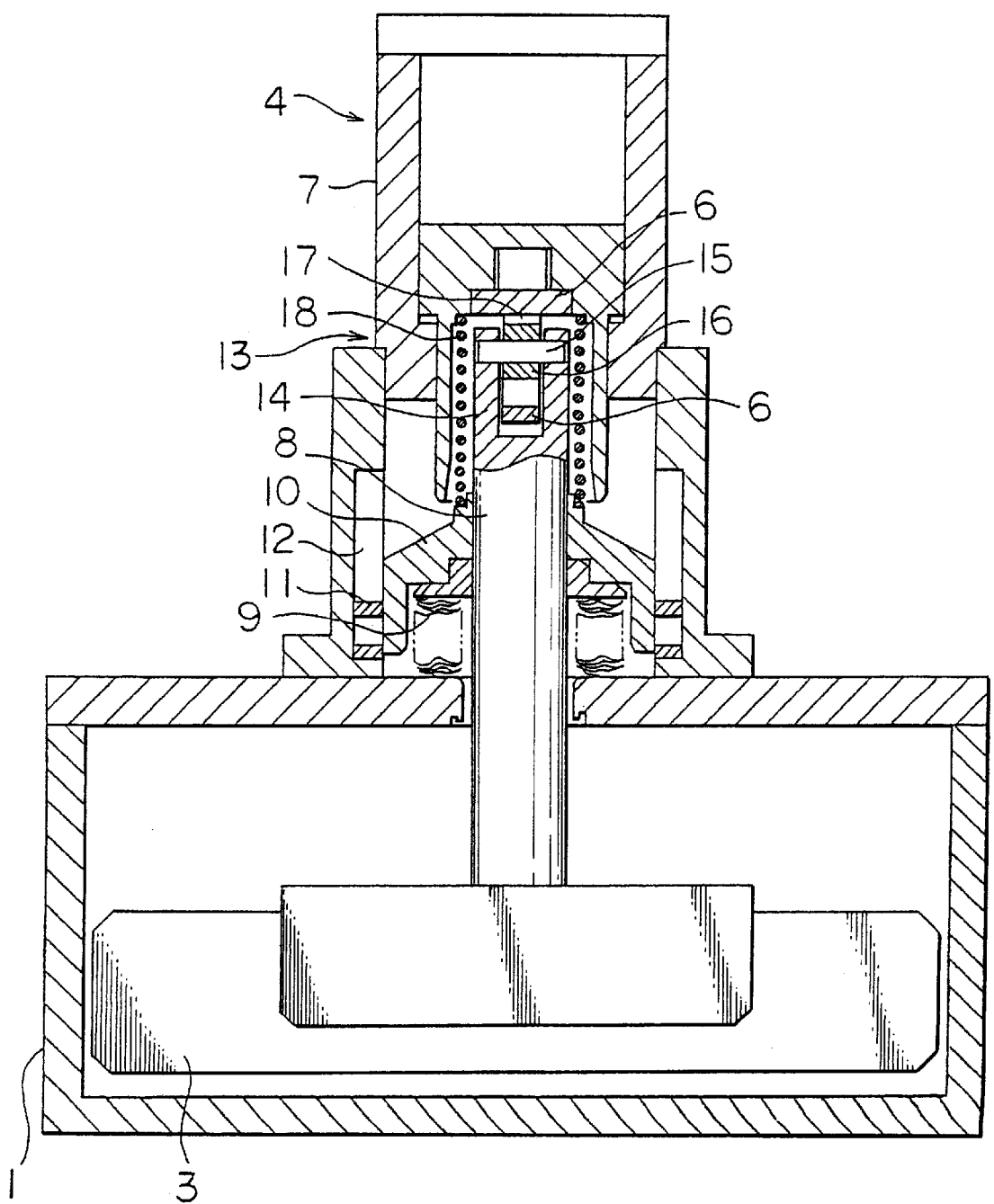
FIG. 3 is a vertically sectioned front view of the gate valve in a state just before the gate valve is closed.
Figure 4:
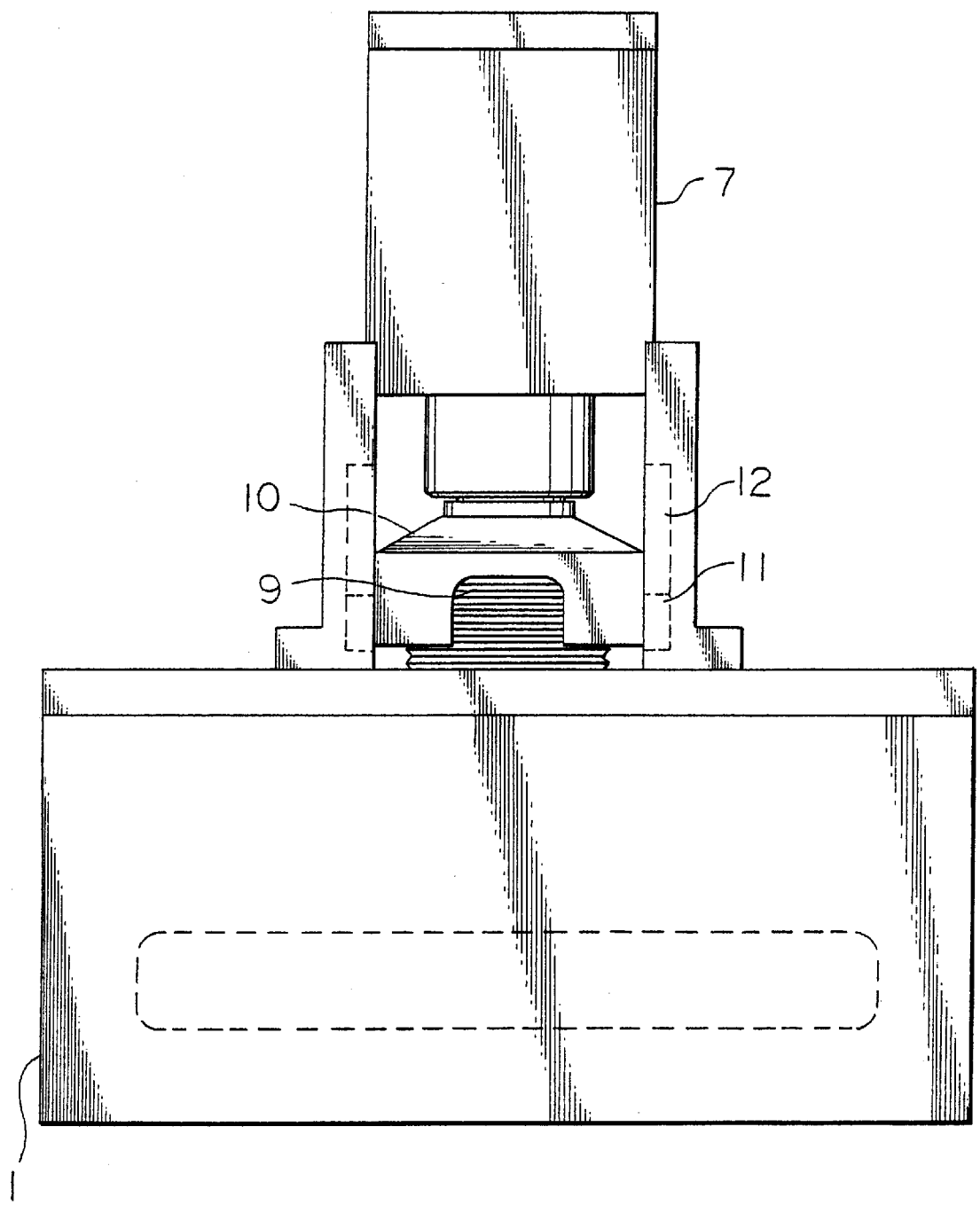
FIG. 4 is a front view of the gate valve in a state just before the gate valve is closed.
Figure 6:
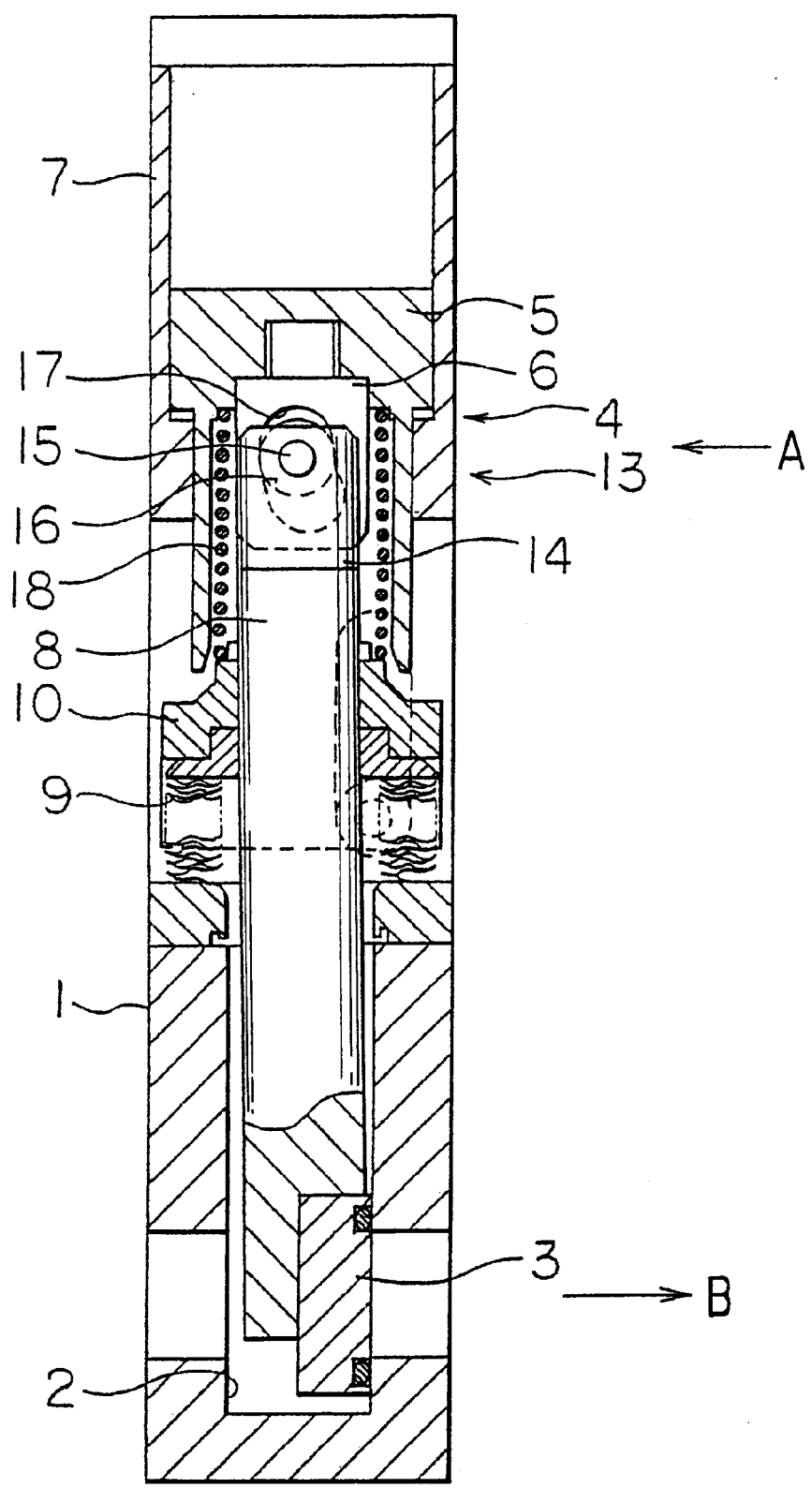
FIG. 6 is a vertically sectioned side view of a gate valve in a state just before the gate valve is closed.
Figure 7:
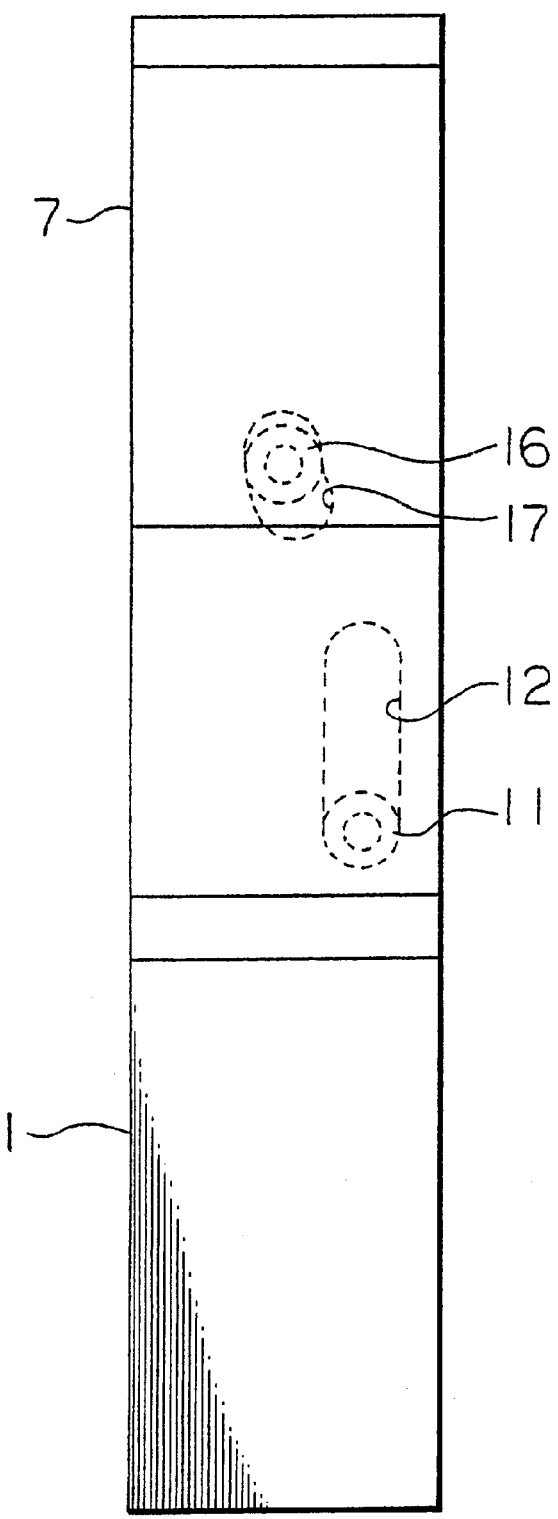
FIG. 7 is a side view of the gate valve in a state just before the gate valve is closed.

According to the gate valve mentioned above, when the piston rod 6 is lowered from the position shown in FIG. 1 and FIG. 2 by the action of said piston cylinder means 4 to close the valve, the valve rod 8 is also lowered, against the spring force of the tension spring 18, so that the valve disc 3 is lowered as shown in FIG. 6 and FIG. 7 to a position where the valve disc 3 faces the valve seat 2. At this position, the pivotal shafts 11 are brought into contact with the lower ends of said guide grooves 12.

In this state, the downward movement of the valve rod 8 is stopped, but the piston rod 6 is lowered further while compresing the extension spring 18, so that said roller 16 moves in the leftward direct along said inclined elongated hole 17 and thus the valve 8 is inclined centering around the pivotal shaft 11 as shown by the arrow A in FIG. 6. According to the movement of the valve rod 8 the valve disc 3 connected to the lower end of the valve rod 8 is moved in the direction of the arrow B and brought into contact under pressure with the valve seat 2.

After the downward movement of the piston rod 6 due to the piston cylinder means 4 is stopped, the valve disc 3 is maintained in the contact state under pressure with the valve seat 2.

When the piston cylinder means 4 is operated to open the valve, only the piston rod 6 is moved up.

At this stage, the valve rod 8 does not moved up by the frictional force exerted between the valve seat 2 and the valve disc 3. Accordingly, along the elongated hole 17 said roller 16 is moved rightwards and at the same time the inclined valve rod 8 is restored in an upright position to move the valve disc 3 in a direction opposite to the direction of arrow A and separate from the valve seat 2. By moving up of the piston rod 6, the valve rod 8 and the roller 16 are moved up together with the valve disc 3 to open the valve as shown in FIG. 1. and FIG. 2.

It is preferable that said guide grooves 12 and the pivotal shafts 11 are located on or near a line passing through the surface of the valve seat 2 facing the valve disc 3.

According to this embodiment, the valve disc 3 moves in a direction normal substantially to the surface of the valve seat 2 and is brought into contact with the valve seat 2, so that the unbalance contact of the valve seat 2 can be avoided.

Figure 10:
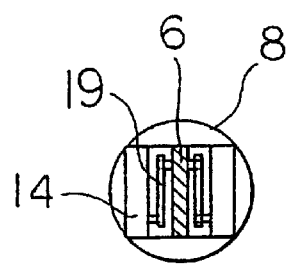
FIG. 10 is a horizontal sectional plan view of a piston rod of the gate valve according to the other embodiment of the present invention.

FIG. 10 shows another embodiment of the present invention, wherein an inclined link 19 is used instead of providing said pin 15, said roller 16 and the inclined elongated hole 17.

Said inclined link 19 is connected between said bifurcated portion 14 and said piston rod 6. That is, in this embodiment, one end of said link 19 is connected rotatably to the front portion of the bifurcated portion 14 and the other end of said link 19 is connected rotatably to the back portion of the piston rod 6.

Accordingly, when said piston rod 6 is pushed down relative to said valve rod 8, the inclined link 19 is inclined and the upper portion of the piston rod 8 is moved backwards relative to the bifurcated portion 14, so that the lower portion of said piston rod 6 is moved forwards centering around the pivotal shaft 11, and the disc 3 is brought into contact with the valve seat 2 under pressure.

The gate valve of this embodiment serves as like as the gate valve mentioned in the preceding embodiments and accordingly the detailed explanation thereof is omitted.

EFFECT OF THE INVENTION

This invention provides important advantages over conventional gate valves. For example, the gate valve of the present invention has no mechanical parts for urging the valve disc 3 toward the valve seat 2 in the valve housing 1 which is hermetically sealed to the outside by the bellows 9, so that foreign matters which would probably be produced due to the frictional movements of the mechanical parts or the like can be prevented from being produced, on the contrary to the conventional gate valve. Further, the driving means for driving the valve disc can be simple in construction. Furthermore, the gate valve of the present invention can be made small in height and size, because only one piston cylinder means 4 is required.

Further, in the present invention, the valve disc 3 and the valve rod 8 are inclined centering around the pivotal shaft 11 which is located at the intermediate position of the axial lenght of the cylindrical bellows 9 under the compressed state, so that the deformations of the upper and lower portions of the cylindrical bellows 9 are symmetrically and the irregular motion or the snaking motion of the cylindrical bellows 9 can be avoided. Accordingly, no abnormal stresses are applied to the cylindrical bellows 9, so that the service life thereof can be prolonged remarkably.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A gate valve comprising, a valve housing, a valve disc disposed in said valve housing so that it is selectively brought into contact with a valve seat provided inside of said valve housing, a valve rod sealingly projected from the inside of said valve housing to the outside of said valve housing, said valve rod being capable of moving up and down and inclining, a cylindrical bellows provided at the outside of said valve housing, one end of said cylindrical bellows being sealingly secured to said valve housing and the other end of said cylindrical bellows being sealingly secured to said valve rod, and a driving means provided at the outside of said valve housing for (1) driving said valve rod to move said valve disc between a position where said valve disc is faced with a gap to said valve seat and a position where said valve disc is not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, a roller formed on one of said piston rod and said valve rod, an elongated obligue hole formed on the other of said piston rod and said valve rod, said roller being passed through said hole to connect said piston rod with said valve rod, a spring for separating axially said piston rod and said valve rod from each other, a guide formed on a side surface of said piston cylinder for guiding said valve rod so as to move up and down, and means for inclining said valve rod at a center of the axial direction of said cylindrical bellows in the compressed state thereof, and wherein when said piston rod is urged toward said valve rod, said valve rod is inclined centering around said center and said disc is brought into contact under pressure with said valve seat.

2. A gate valve as claimed in claim 1, wherein said valve rod has a pivotal shaft which is guided by said guide, and wherein said pivotal shaft and said guide are located on or near a line passing through the surface of the valve seat facing the valve disc.

3. A gate valve comprising; a valve housing, a valve disc disposed in said valve housing so that it is selectively brought into contact with a valve seat provided inside of said valve housing, a valve rod sealingly projected from the inside of said valve housing to the outside of said valve housing, said valve rod being capable of moving up and down and inclining, a cylindrical bellows provided at the outside of said valve housing, one end of said cylindrical bellows being sealingly secured to said valve housing and the other end of said cylindrical bellows being sealingly secured to said valve rod, and a driving means provided at the outside of said valve housing for (1) driving said valve rod to move said valve disc between a position where said valve disc is faced with a gap to said valve seat and a position where said valve disc in not faced to said valve seat, and for (2) inclining said valve rod so that said valve disc is brought into contact under pressure with said valve seat when said valve disc is moved to the position where it is faced to said valve seat, wherein said driving means comprises a piston cylinder means having a piston cylinder and a piston rod, an inclined link with both ends pivotally connected to said piston rod and said valve rod, respectively, so as to connect said piston rod with said valve rod, a spring for separating axially said piston rod and said valve rod from each other, a guide formed on a side surface of said piston cylinder for guiding said valve rod so as to move up and down, and means for inclining said valve rod at a center of the axial direction of said cylindrical bellows in the compressed state thereof, and wherein when said piston rod is urged toward said valve rod, said valve rod is inclined centering around said center and said disc is brought into contact under pressure with said valve seat.

4. A gate valve as claimed in claim 3, wherein said valve rod has a pivotal shaft which is guided by said guide, and wherein said pivotal shaft and said guide are located on or near a line passing through the surface of the valve seat facing the valve disc.

* * * * *